United States Patent
Ringsquandl et al.

(10) Patent No.: US 12,253,996 B2
(45) Date of Patent: Mar. 18, 2025

(54) METHOD AND SYSTEM FOR AUTOMATED COLUMN TYPE ANNOTATION

(71) Applicant: Siemens Aktiengesellschaft, Munich (DE)

(72) Inventors: Martin Ringsquandl, Raubling (DE); Mitchell Joblin, Surrey (CA); Aneta Koleva, Munich (DE); Swathi Shyam Sunder, Bengaluru (IN)

(73) Assignee: Siemens Aktiengesellschaft, Munich (DE)

( * ) Notice: Subject to any disclaimer, the term of this patent is extended or adjusted under 35 U.S.C. 154(b) by 86 days.

(21) Appl. No.: 18/338,302

(22) Filed: Jun. 20, 2023

(65) Prior Publication Data

US 2023/0418802 A1  Dec. 28, 2023

(30) Foreign Application Priority Data

Jun. 22, 2022  (EP) .................................. 22180444

(51) Int. Cl.
*G06F 16/20* (2019.01)
*G06F 16/21* (2019.01)
*G06F 16/22* (2019.01)
*G06F 16/28* (2019.01)

(52) U.S. Cl.
CPC ........ *G06F 16/2282* (2019.01); *G06F 16/211* (2019.01); *G06F 16/285* (2019.01)

(58) Field of Classification Search
CPC .... G06F 16/20; G06F 16/211; G06F 16/2282; G06F 16/285
See application file for complete search history.

(56) References Cited

U.S. PATENT DOCUMENTS

| | | | | |
|---|---|---|---|---|
| 2012/0036130 | A1* | 2/2012 | Light | G06F 40/30 707/769 |
| 2019/0179936 | A1* | 6/2019 | Javitt | G06F 16/2282 |
| 2021/0406452 | A1* | 12/2021 | Hasan | G06N 3/08 |
| 2022/0075805 | A1* | 3/2022 | Goodsitt | G06N 3/045 |

(Continued)

OTHER PUBLICATIONS

Article entitled "Generating Table Vector Representations", by Koleva et al., dated Oct. 28, 2021 (Year: 2021).*

(Continued)

*Primary Examiner* — Mahesh H Dwivedi
(74) *Attorney, Agent, or Firm* — Schmeiser, Olsen & Watts LLP

(57) ABSTRACT

A solution for automated column type annotation maps each column contained in a table to a column annotation class. A pre-processor transforms the table into a numerical tensor representation by outputting a sequence of cell tokens for each cell in the table. A table encoder encodes the sequences of cell tokens and a column annotation label for each column into body cell embeddings. A body pooling component processes the body cell embeddings to provide column representations. A classifier classifies the column representations to provide for each column, confidence scores for each column annotation class. The method concludes with comparing the highest confidence score for each column with a threshold, and, if the highest confidence score for each column is above the threshold, annotating each column with the respective column annotation class.

12 Claims, 10 Drawing Sheets

(56) References Cited

U.S. PATENT DOCUMENTS

2023/0161774 A1* 5/2023 Khurana ................. G06N 7/01 707/769

OTHER PUBLICATIONS

Z. Zhang: "Effective and efficient semantic table interpretation using tableminer+", in: Semantic Web, 2017; 2017.

P. Yin, G. Neubig, W. Yih, S. Riedel,"Tabert: Pretraining for joint understanding of textual and tabular data", in: ACL, 2020; Jul. 5-10, 2020.

Nguyen, Phuc et al: "MTab4DBpedia: Semantic Annotation for Tabular Data with DBpedia", Semantic Web, 2020, pp. 1-13, XP093009670, Retrieved from the Internet: URL:https://www.semantic-web-journal.net/system/files/swj2609.pdf [retrieved on Dec. 20, 2022]; 2020; Date Accessed: Dec. 27, 2022.

S. Chen, A. Karaoglu, C. Negreanu, T. Ma, J. Yao, J. Williams, A. Gordon, C. Lin: "LinkingPark: An integrated approach for semantic table interpretation", in: SemTab@ISWC, 2020; 2020.

* cited by examiner

| Tag No. | Eq.name | Material | Weight kg | Dim |
|---|---|---|---|---|
| P-1 | Cent. Pump | Graphite / CS | 200 | – |
| T-2 | Wtr Tank | PP Glass lined | 500 | 1mx1mx2m |

T

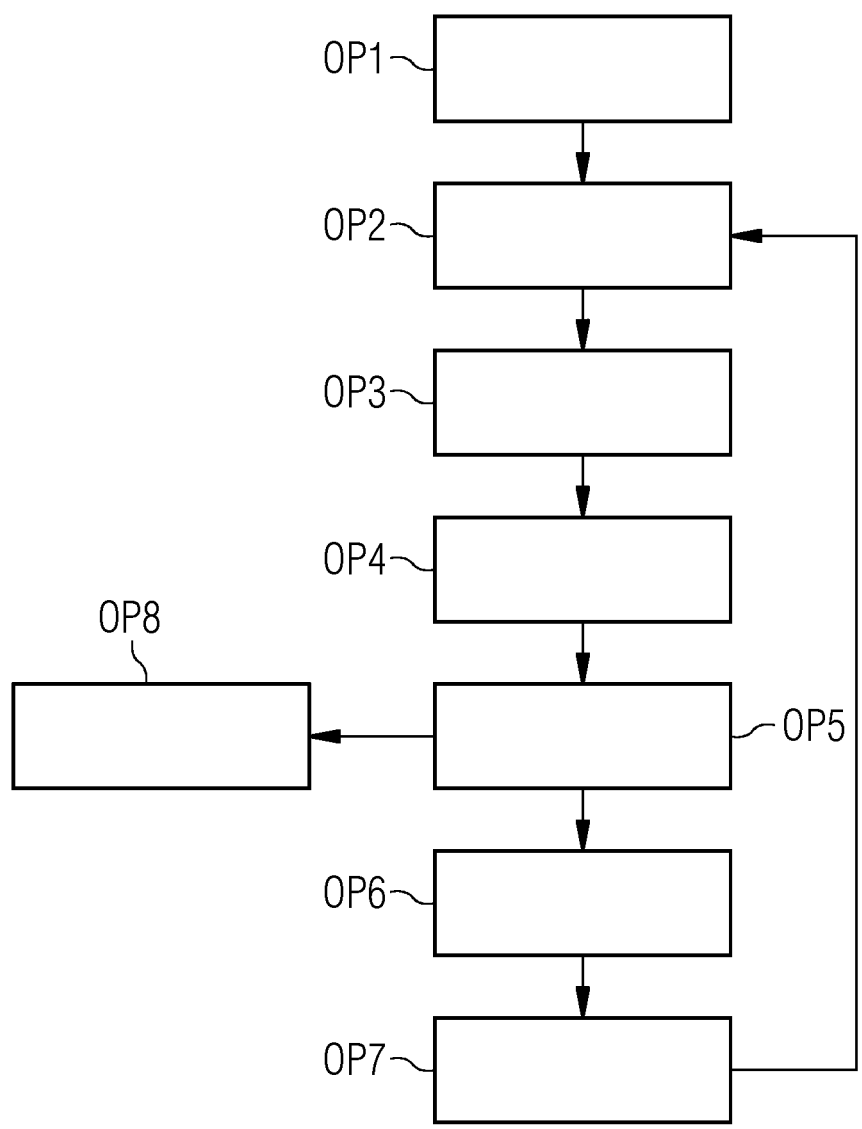

METHOD AND SYSTEM FOR AUTOMATED COLUMN TYPE ANNOTATION

CROSS-REFERENCE TO RELATED APPLICATIONS

This application claims priority to EP Application No. 22180444.6, having a filing date of Jun. 22, 2022, the entire contents of which are hereby incorporated by reference.

FIELD OF TECHNOLOGY

The following relates to a method and system for automated column type annotation.

BACKGROUND

The digitalization of industrial equipment, i.e., building so-called digital twins of plants and factories, is a major challenge. One of the main problems is that information about equipment is stored in disparate data sources using different schemas. Due to lack of tool support, engineers often simply maintain equipment lists in several spreadsheets. This leads not only to unaligned schemas, but also introduces a great variety in vocabulary, since every engineer has their own way of describing technical concepts.

Typically, such equipment spreadsheets are roughly organized in tabular form, where each row represents an equipment, and each column represents some property of that equipment.

In FIG. 3, an example of a simple equipment table is given in the form of a table T. The table T shows that column names can be any free text describing the content of that column. These names depend on the individual taste of the engineer and their semantics are hard to interpret even for other engineers. Similarly, the content of each column can have ambiguous semantics using abbreviations "Cent." for "centrifugal" or multi-valued entries "Graphite/CS". Further, physical quantities like the "dimensions" or "volume" of a tank can be described in a number of ways, e.g., "1 m×1 m×2 m" would be a more detailed way compared to "2 m^3".

In the worst case, a company owning multiple plants, where each plant has again sub-units, would have spreadsheets in different format and vocabulary for every plant and every sub-unit.

The task of standardizing all equipment formats and onboarding them into a single system (database) is done by a team of data engineers who do not know the domain in detail. This leads to long and costly discussions between domain experts, who know details about the equipment, and data engineers who know how to build data pipelines.

The problem of making computer programs understand the semantics of tables is called table interpretation. This is the first step in any data pipeline that needs to integrate data from unknown relational schemas. One sub-problem of table interpretation is column type annotation (CTA). In the following, the terms "column type annotation" and "CTA" will be used interchangeably for the problem or task of column type annotation, while the term "column annotation" will be used for a specific annotation of a specific column that is already known, provided by a user, or computed by a CTA algorithm according to one of the embodiments.

Formally column type annotation is defined as a mapping l: C→T, given a set of source table schemas S={$s_1, s_2, \ldots, s_N$}, where each $s_i=\{c_{i,1} c_{i,2}, c_{i,m}\}$ is a set of columns (C is the space of all columns), and a target schema T={$t_1, t_2, \ldots, t_k$}.

In industry, aligning source schemas to a standardized target schema is done manually by data engineers. This means long communication loops between data engineers and domain experts.

In the state of the art, unsupervised column type annotation algorithms are known that rely on some form of string edit distance or fuzzy string matching from source columns to column annotation classes as defined in the target schema, for example as disclosed in Z. Zhang: "Effective and efficient semantic table interpretation using tableminer+", in: Semantic Web, 2017.

Recently, supervised machine learning solutions using contextual table encoding such as TaBERT have been used to solve the table-conditioned task which makes the representation of each column dependent on the whole table content, for example as disclosed in P. Yin, G. Neubig, W. Yih, S. Riedel, Tabert: "Pretraining for joint understanding of textual and tabular data", in: ACL, 2020.

Methods submitted for the SemTab challenge rely on lookup services for querying the available schemas and also on previous knowledge related to the entities in the table, for example as disclosed in S. Chen, A. Karaoglu, C. Negreanu, T. Ma, J. Yao, J. Williams, A. Gordon, C. Lin: "Linkingpark: An integrated approach for semantic table interpretation", in: SemTab@ISWC, 2020.

SUMMARY

An aspect relates to identify a problem in the conventional art and to find a technical solution for this.

According to the computer implemented method for automated column type annotation, wherein the method maps each column contained in a table to a column annotation class of a set of column annotation classes, wherein each column contains a header cell and a set of body cells, the following operations are performed by components, wherein the components are hardware components and/or software components executed by one or more processors:

transforming, by a pre-processor, the table into a numerical tensor representation by outputting a sequence of cell tokens for each cell in the table, encoding, by a table encoder, the sequences of cell tokens and a column annotation label for each column into body cell embeddings, wherein at least one of the column annotation labels indicates a correct column annotation class for the respective column and at least one of the column annotation labels indicates that the column annotation class for the respective column is unknown, processing, by a body pooling component, the body cell embeddings to provide column representations, classifying, by a classifier, the column representations in order to provide for each column, confidence scores for each column annotation class, comparing the highest confidence score for each column with a threshold, and if the highest confidence score for each column is above the threshold, annotating each column with the respective column annotation class.

The system for automated column type annotation, mapping each column contained in a table to a column annotation class of a set of column annotation classes, wherein each column contains a header cell and a set of body cells, comprises the following components, wherein the components are hardware components and/or software components executed by one or more processors:

a pre-processor, configured for transforming the table into a numerical tensor representation by outputting a sequence of cell tokens for each cell in the table, a table encoder, configured for encoding the sequences of cell tokens and a column annotation label for each column into body cell embeddings, wherein at least one of the column annotation labels indicates a correct column annotation class for the respective column and at least one of the column annotation labels indicates that the column annotation class for the respective column is unknown, a body pooling component, configured for processing the body cell embeddings to provide column representations, a classifier, configured for classifying the column representations in order to provide for each column, confidence scores for each column annotation class, and at least one processor, configured for
comparing the highest confidence score for each column with a threshold, and
if the highest confidence score for each column is above the threshold, annotating each column with the respective column annotation class.

In connection with embodiments of the invention, unless otherwise stated in the description, the terms "training", "generating", "computer-aided", "calculating", "determining", "reasoning", "retraining" and the like relate to actions and/or processes and/or processing steps that change and/or generate data and/or convert the data into other data, the data in particular being or being able to be represented as physical quantities, for example as electrical impulses.

The term "computer" should be interpreted as broadly as possible, in particular to cover all electronic devices with data processing properties. Computers can thus, for example, be personal computers, servers, clients, programmable logic controllers (PLCs), handheld computer systems, pocket PC devices, mobile radio devices, smartphones, devices or any other communication devices that can process data with computer support, processors and other electronic devices for data processing. Computers can in particular comprise one or more processors and memory units.

In connection with embodiments of the invention, a "memory", "memory unit" or "memory module" and the like can mean, for example, a volatile memory in the form of random-access memory (RAM) or a permanent memory such as a hard disk or a Disk.

The method and system, or at least some of their embodiments, provide a novel table encoding and training procedure that allows to predict missing column annotations jointly, i.e., conditioned on any combination of existing column annotations.

The ability to jointly predict column annotations is critical when users are involved in annotating columns. Once the user gives an annotation, the predictions of the model incorporate this information in the next step. This essentially enables active learning use cases where the user and the model interact with each other sequentially.

The method and system, or at least some of their embodiments, provide a label-conditioned model for column type annotation that takes known column annotations as input. This allows a user to interact with the model by giving labels to columns sequentially and receiving updated predictions that are conditioned on the previously given labels.

The method and system, or at least some of their embodiments, address the scarcity of labeled data which is crucial for industrial use. The scarcity of labeled data impedes the use of machine learning models for column type annotation as it is extremely costly to get human expert labels, since this requires that a domain expert needs to be familiar with the source schemas and instructed about the target schema.

The method and system, or at least some of their embodiments, specify different approaches on how to make the machine learning model more label efficient.

Finally, onboarding industrial equipment into structured "digital twins" is the main issue preventing companies from digitalization. By automating and standardizing the column type annotation task, downstream data pipelines may also be automated to a higher degree. Less need for communication between data engineers and domain experts means more efficient onboarding processes overall.

An embodiment of the method comprises the additional operation of automatically feeding data contained in the table as well as the column annotations into an automated data ingestion pipeline.

An embodiment of the method comprises the additional operations of if the highest confidence score for at least one of the columns is below the thresholds
outputting, by a user interface, for each column the column annotation class with the highest confidence score,
detecting, by the user interface, a user interaction providing a revised column annotation label for one of the columns that specifies a correct column annotation class, and
repeating the operations of encoding, processing, classifying, and comparing based on the revised column annotation label.

In another embodiment of the method and system, the table encoder and the classifier form a table-conditioned and label-conditioned machine learning model, which is a parameterized function that corresponds to a probability of a column annotation class of a column and is conditioned on the table as well as all the column annotation labels.

In an embodiment of the method and system, the table encoder performs the operations of
encoding, by a cell token encoder, in particular a neural network, the sequences of cell tokens of the header cells and the body cells into latent header cell representations and latent body cell representations,
encoding, by a column label encoder, each column annotation label into a latent label representation,
processing, by a row transformer and a column transformer, the latent body cell representations,
transforming, by a header transformer, each latent header cell representation and the corresponding latent label representation into a header cell embedding, and
aggregating, by an aggregator, the output of the row transformer, the output of the column transformer, and the header cell embeddings into the body cell embeddings.

In an embodiment of the method and system, parameters of the table encoder and the classifier are initially trained with the following operations:
storing, in a database, a set of training tables and at least one column annotation label indicating a correct column annotation class for the respective column for each training table,
randomly sampling a mask for each training table, with the mask masking at least one of the column annotation labels for the respective training table,
computing, by the classifier, for the column with the masked column annotation label confidence scores for each column annotation class, minimizing, during training, a loss between the correct column annotation class and the computed confidence scores.

In an embodiment of the method and system, the set of training tables is at least in part generated using uniform slicing sampling, wherein multiple sub-tables are generated as training tables from a source table by randomly slicing body cells of the source table.

This embodiment helps to avoid overfitting to very particular table contexts in the training data.

In an embodiment of the method, before training, a self-supervised pre-training procedure is executed comprising the operations of sampling body cell masks randomly, resulting in masked cells that are not visible to the table encoder, training a token decoder to reconstruct the content of each masked cell while simultaneously training the token encoder, wherein a loss between the original content of the masked cell and the reconstructed content of the masked cell is minimized.

This embodiment introduces a self-supervised pre-training procedure that lowers the number of labels needed, which is advantageous since obtaining column annotation labels from human experts is expensive.

In an embodiment of the method and system, the classifier is a neural network, in particular a fully connected layer or a multi-layer neural network.

The computer program product (non-transitory computer readable storage medium having instructions, which when executed by a processor, perform actions) with program instructions for carrying out a method.

The provisioning device for the computer program product stores and/or provides the computer program product.

BRIEF DESCRIPTION

Some of the embodiments will be described in detail, with reference to the following figures, wherein like designations denote like members, wherein:

FIG. 12 shows a flowchart of a possible exemplary embodiment of a method for automated column type annotation.

DETAILED DESCRIPTION

In the following description, various aspects of embodiments of the present invention and embodiments thereof will be described. However, it will be understood by those skilled in the art that embodiments may be practiced with only some or all aspects thereof. For purposes of explanation, specific numbers and configurations are set forth in order to provide a thorough understanding. However, it will also be apparent to those skilled in the art that the embodiments may be practiced without these specific details.

The described components can each be hardware components or software components. For example, a software component can be a software module such as a software library; an individual procedure, subroutine, or function; or, depending on the programming paradigm, any other portion of software code that implements the function of the software component. A combination of hardware components and software components can occur, in particular, if some of the effects according to embodiments of the invention are exclusively implemented by special hardware (e.g., a processor in the form of an ASIC or FPGA) and some other part by software.

Figure 1:
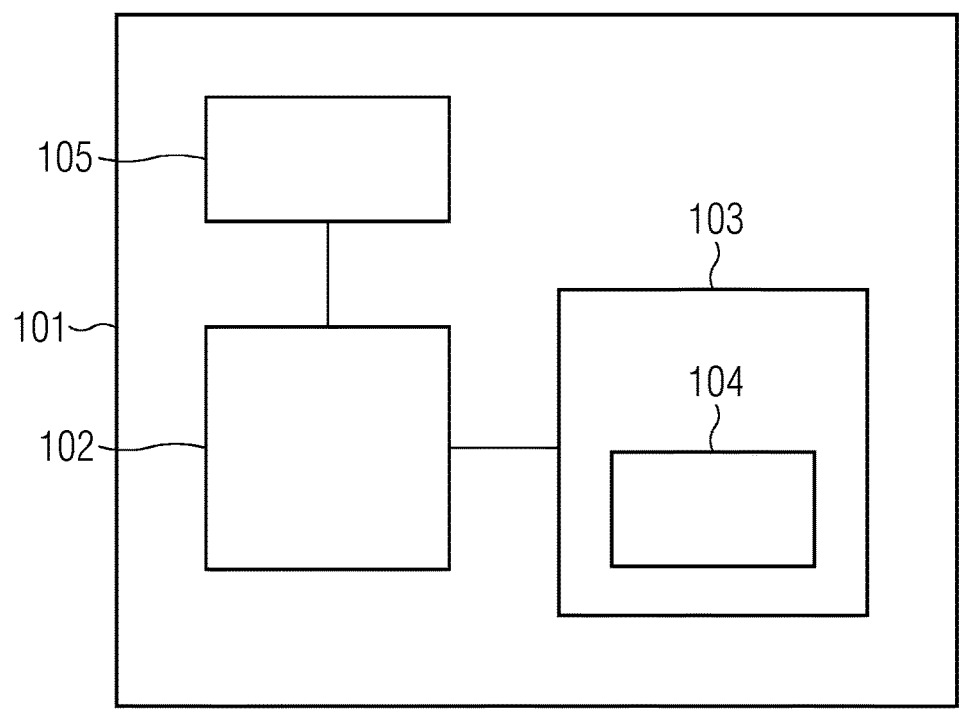
FIG. 1 shows one sample structure for computer-implementation of embodiments of the invention.

FIG. 1 shows one sample structure for computer-implementation of embodiments of the invention which comprises:

(101) computer system (102) processor (103) memory (104) computer program (product)

(105) user interface

In this embodiment of the invention the computer program product 104 comprises program instructions for carrying out embodiments of the invention. The computer program 104 is stored in the memory 103 which renders, among others, the memory and/or its related computer system 101 a provisioning device for the computer program product 104. The system 101 may carry out embodiments of the invention by executing the program instructions of the computer program 104 by the processor 102. Results of embodiments of the invention may be presented on the user interface 105. Alternatively, they may be stored in the memory 103 or on another suitable means for storing data.

Figure 2:
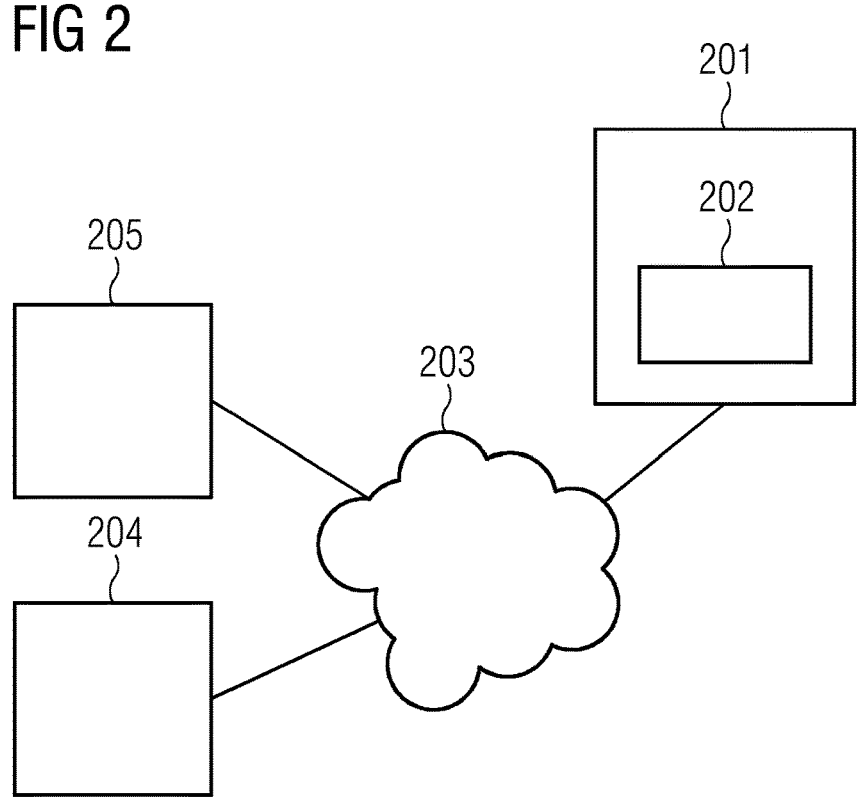
FIG. 2 shows another sample structure for computer-implementation of embodiments of the invention.

FIG. 2 shows another sample structure for computer-implementation of embodiments of the invention which comprises:

(201) provisioning device (202) computer program (product)

(203) computer network/Internet (204) computer system (205) mobile device/smartphone In this embodiment the provisioning device 201 stores a computer program 202 which comprises program instructions for carrying out embodiments of the invention. The provisioning device 201 provides the computer program 202 via a computer network/Internet 203. By way of example, a computer system 204 or a mobile device/smartphone 205 may load the computer program 202 and carry out embodiments of the invention by executing the program instructions of the computer program 202.

The embodiments shown in FIGS. 5 to 12 can be implemented with a structure as shown in FIG. 1 or FIG. 2.

As mentioned above, table interpretation, and in particular column type annotation (CTA), is the first step in any data pipeline that needs to integrate data from unknown relational schemas.

Formally column type annotation is defined as a mapping l: C→T, given a set of source table schemas $S=\{s_1, s_2, \ldots, s_N\}$, where each $s_i=\{c_{i,1}c_{i,2},c_{i,m}\}$ is a set of columns (C is the space of all columns), and a target schema $T=\{t_1, t_2, \ldots, t_k\}$ containing column annotation classes $t_1, t_2, \ldots, t_k$. Each column $c_{ij}=(h,b)$ is a tuple containing its header cell h and a set of body cells b.

Machine Learning Classification Task

The following embodiments solve the column type annotation problem as a machine learning classification task. Given a set of training data of already annotated columns $D=\{(x_{1,1},y_{1,1}), (x_{2,1},y_{2,1}), \ldots (x_{N,m},y_{N,m})\}$, where $x_{i,j}$ is the j-th column belonging to i-th table's and $y_{i,j} \in T$ is its column annotation, the goal of a machine learning model according to each embodiment is to find the correct annotations for the remaining columns.

An independent machine learning model is a parameterized function $$f_\theta \cong P(y_{i,j}|x_{i,j}),$$

i.e., the classification of every column is done independently and only conditioned on the column itself. Effectively, this independence assumption implies that all contextual information stemming from the other columns of the table is ignored. However, the samples in the training data are not independent, since columns belonging to the same table are often related to each other.

A table-conditioned machine learning model is a parameterized function $$f_\theta \cong P(y_{i,j}|x_{i,1},x_{i,2}, \ldots x_{i,m}).$$

In this formulation the classification of every column is done independently and conditioned on the entire i-ths table (i.e., all columns in the table are considered).

A table-conditioned and label-conditioned machine learning model is a parameterized function $$f_\theta \cong P(y_{i,j}|x_{i,1},x_{i,2}, \ldots x_{i,m},y_{i,2}, \ldots ,y_{i,m})$$

that corresponds to the probability of the column annotation class of a column and is conditioned on the entire table as well as all other column annotation labels.

While the independent machine learning model and table-conditioned machine learning model have been introduced for the purpose of illustration, the following embodiments mainly use a table-conditioned and label-conditioned machine learning model.

Figures 3, 4:
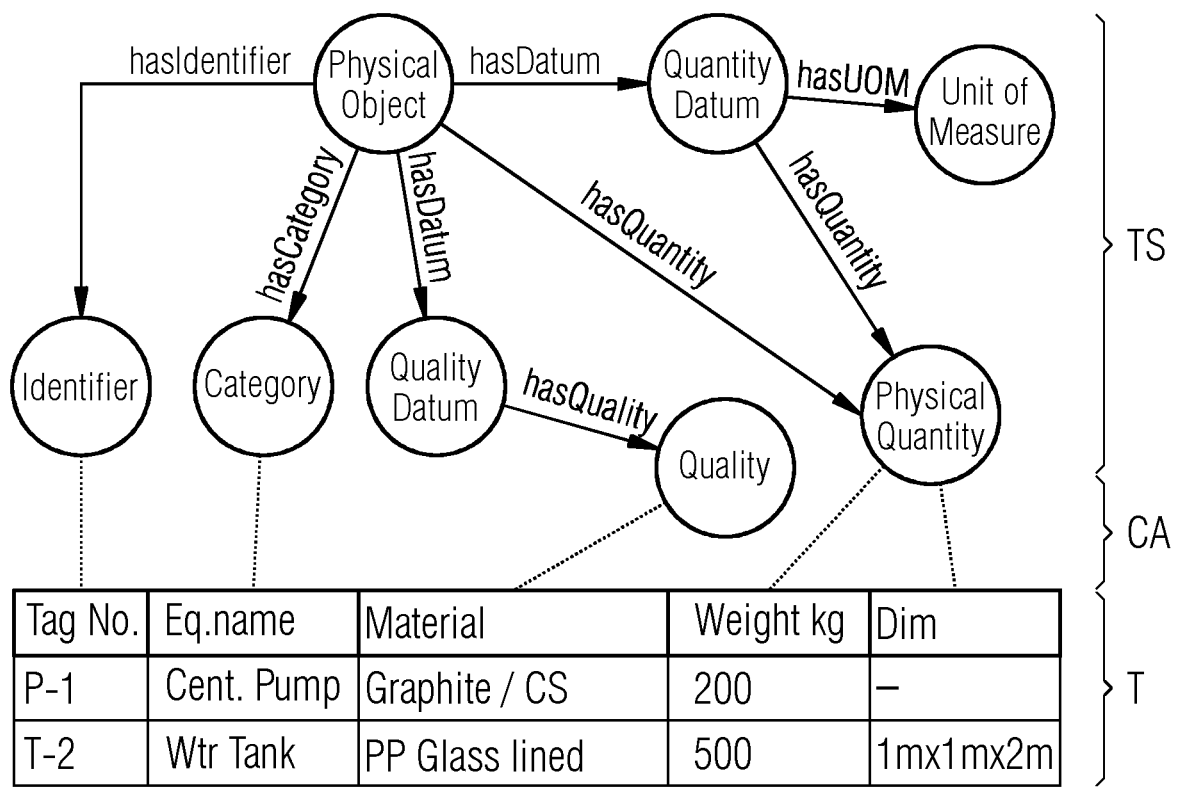
FIG. 3 shows a table T, which is an example equipment table.
FIG. 4 shows a target schema TS and column annotations CA for the table T shown in FIG. 3.

FIG. 4 shows a target schema TS and column annotations CA for the table T shown in FIG. 3. It does not suffice to classify each column independently only conditioned on the column itself. For example, as shown in FIG. 4, if it is known that the "Tag No." column is labeled as an "identifier" column in the target schema, it is unlikely that other columns are "identifiers" too.

The following embodiments automate the standardization of input data contained in tables with respect to a target schema by means of machine learning. Each embodiment contains one or more of the following technical features:

a) a meta data model for column annotations of industrial equipment;
b) a table encoder and classifier (together forming a table-conditioned and label-conditioned machine learning model);
c) a self-supervised pre-training procedure;
d) a CTA training procedure; and
e) a data augmentation procedure using uniform slicing sampling.

Each of these technical features is described in more detail below.

Meta Data Model

The following embodiments are based on a minimal meta data model that allows to represent any kind of physical object (equipment) in the table T which is assumed to have:
an identifier (may not be unique)
Optional:
categories (i.e., a more specific type of the object)
qualities (i.e., properties that are not numeric/quantifiable)
quantities (i.e., properties that are quantifiable (with an optional unit of measure))

Every row in the table T is then instantiated as 'Physical Object' according to this meta data model.

In FIG. 4, a graphical representation of the meta data model is shown above the table T.

Table Encoder Architecture

Preprocessing

Before tables can be encoded, they need to be transformed into a numerical tensor representation.

Figure 5:
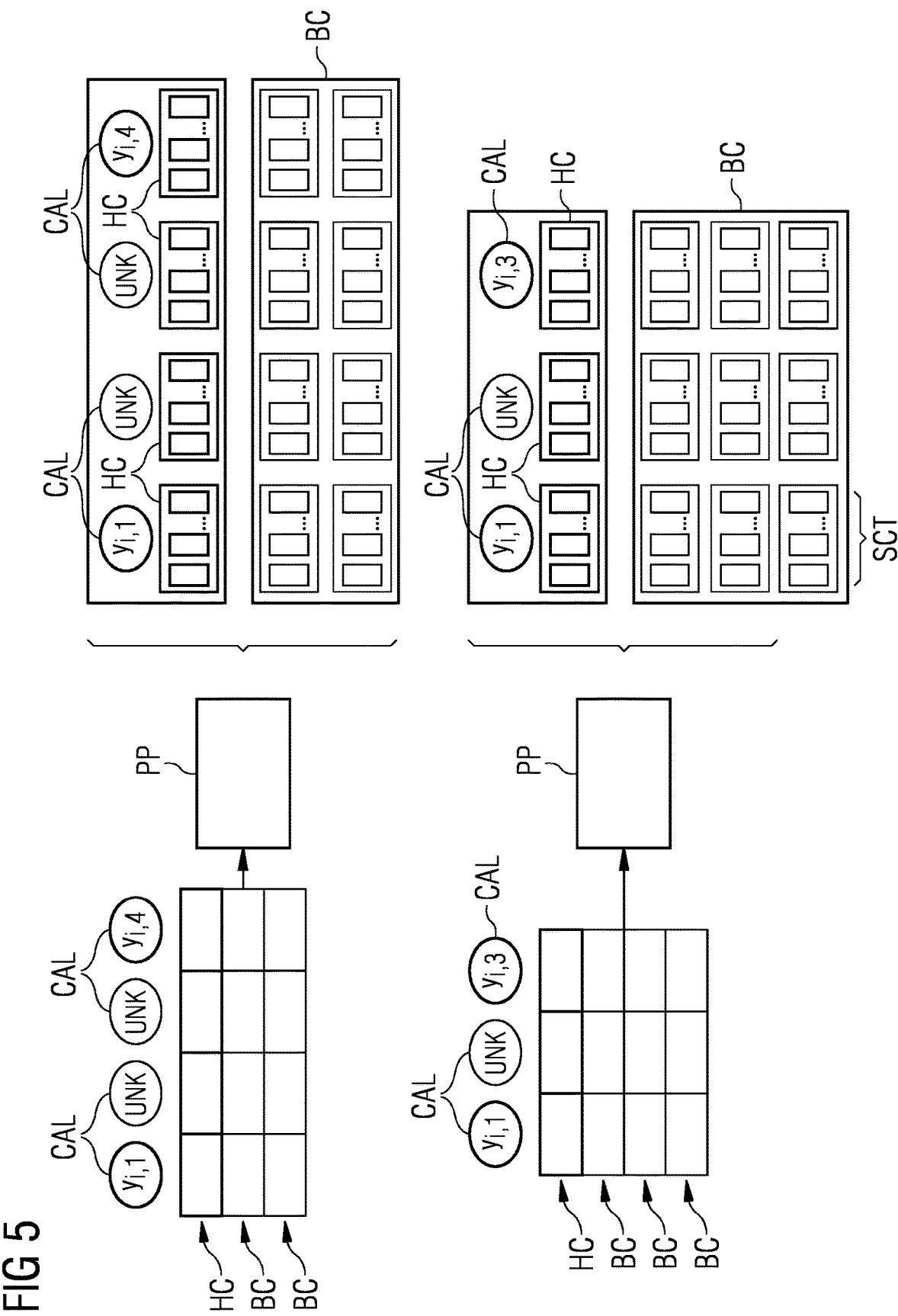
FIG. 5 shows table pre-processing to get numeric tensors.

FIG. 5 shows the pre-processing steps needed for this transformation.

A pre-processor PP outputs a sequence of cell tokens SCT for each cell in the table. It also separates header cells HC from body cells BC of the table, with the latter being the content cells.

Tokenization of a cell can be done in different ways, either on character-, word- or word-piece (token) level.

Additionally, column annotation labels CAL that are missing are encoded as a special class "UNK" for unknown.

Table Encoder

Figure 6:
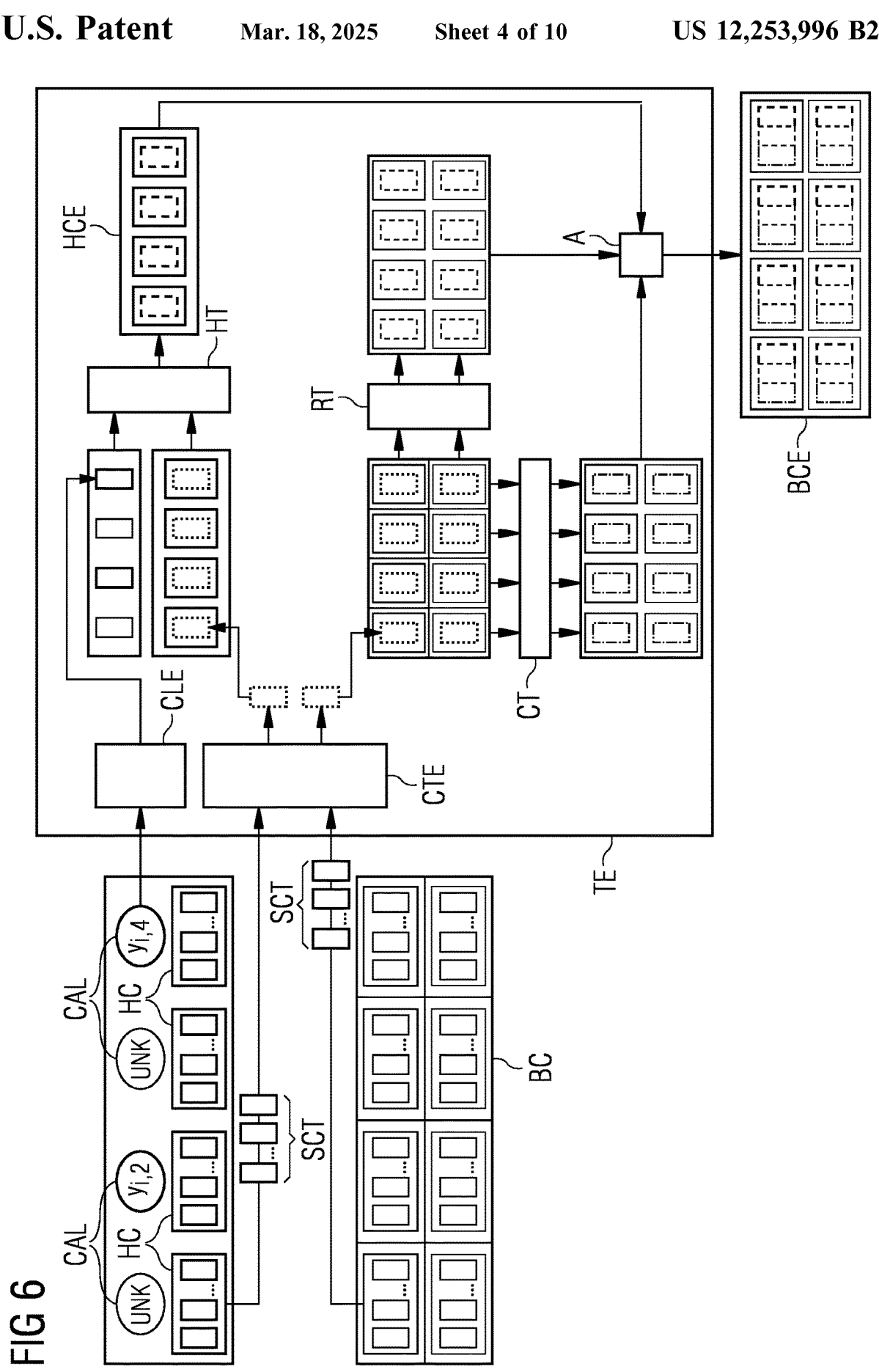
FIG. 6 shows a table encoder architecture.

FIG. 6 shows an embodiment of a table encoder TE.

The first step in the table encoder TE is to feed the sequences of cell tokens SCT of all cells (the header cells HC and the body cells BC) into a cell token encoder CTE. At this stage, the cells are all independently encoded. The cell token encoder CTE is a neural network that produces a single latent representation for every sequence of cell tokens SCT. For example, LSTMs or transformer models could be used here. The latent representation of the sequence of cell tokens SCT is now the cell representation.

Similarly, a column label encoder CLE produces a latent representation for each column annotation label CAL.

The cell representations of the table body are fed into two transformer models, one where each row is the context and one where each column is the context.

The header cell representations are concatenated with the column annotation label representations and then fed through a header transformer HT where all header cells HC are the context. Note that the column annotation label CAL is separate from the header cell HC. The header transformer HT produces a header cell embedding HCE for each header cell HC.

Note that all three transformers (header transformer HT, row transformer RT, column transformer CT) are applying self-attention to the set of cells and do not add any positional encodings since orderings of rows and columns in tables is usually meaningless. In cases where ordering of columns matters, a positional encoding in the column transformer CT and/or row transformer RT can be added.

Finally, the transformed header, row and column embeddings are aggregated by an aggregator A which could be concatenation, summation, etc . . . , to produce the final table encoding in the form of body cell embedding BCE.

Self-Supervised Pre-Training Procedure

Figure 7:
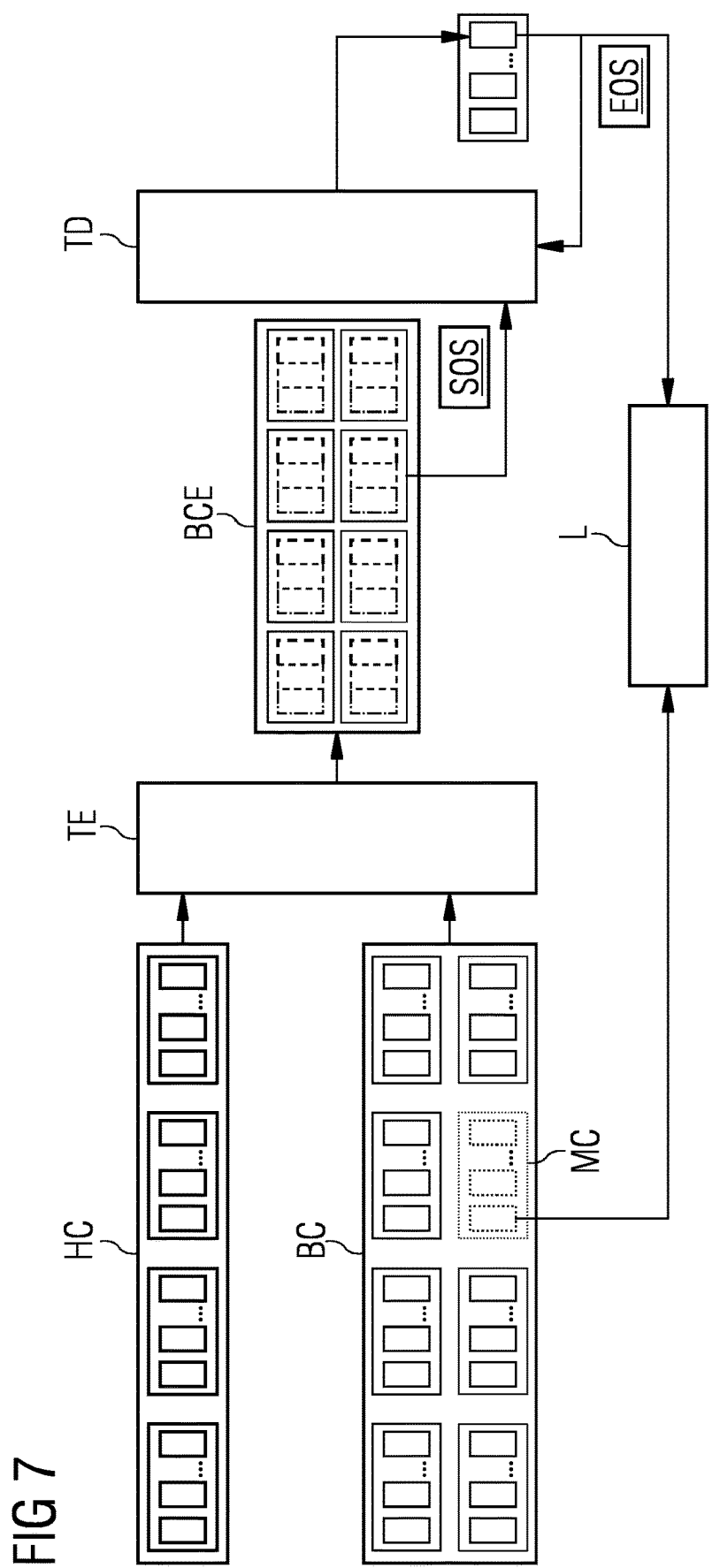
FIG. 7 shows a masked cell self-supervised training procedure.

FIG. 7 shows a masked cell self-supervised training.

As mentioned above, obtaining column annotation labels from human experts is expensive. A way to deal with this label scarcity is to employ unsupervised or self-supervised pre-training procedures. Such training procedures can lower the number of labels needed substantially.

The embodiment shown in FIG. 7 employs a masked cell pre-training procedure as follows:

During training, body cell masks are sampled randomly. To the table encoder TE, those masked cells MC are not visible, i.e., every token in the cell is masked. A token decoder TD is then trained to reconstruct the contents of the masked cell MC, i.e., the complete sequence of cell tokens, from the respective encoded table representation (the body cell embeddings BCE). The token decoder TD works in a causal auto-regressive manner, i.e., the next token output is conditioned on all previous token outputs. This can be done with transform decoders using causal attention or recurrent neural networks such as LSTMs. The token decoder TD starts by receiving a Start-of-Sequence token SOS and it indicates the completion of the sequence with an End-of-Sequence token EOS. The token decoder TD is a temporary artifact that is needed for the training procedure, with the aim of training the token encoder TE.

A simultaneous training of the token encoder TE and token decoder TD is performed by minimizing a loss L between the original sequence of cell tokens and the reconstructed sequence of cell tokens for the masked cell MC.

CTA Training Procedure

Figure 8:
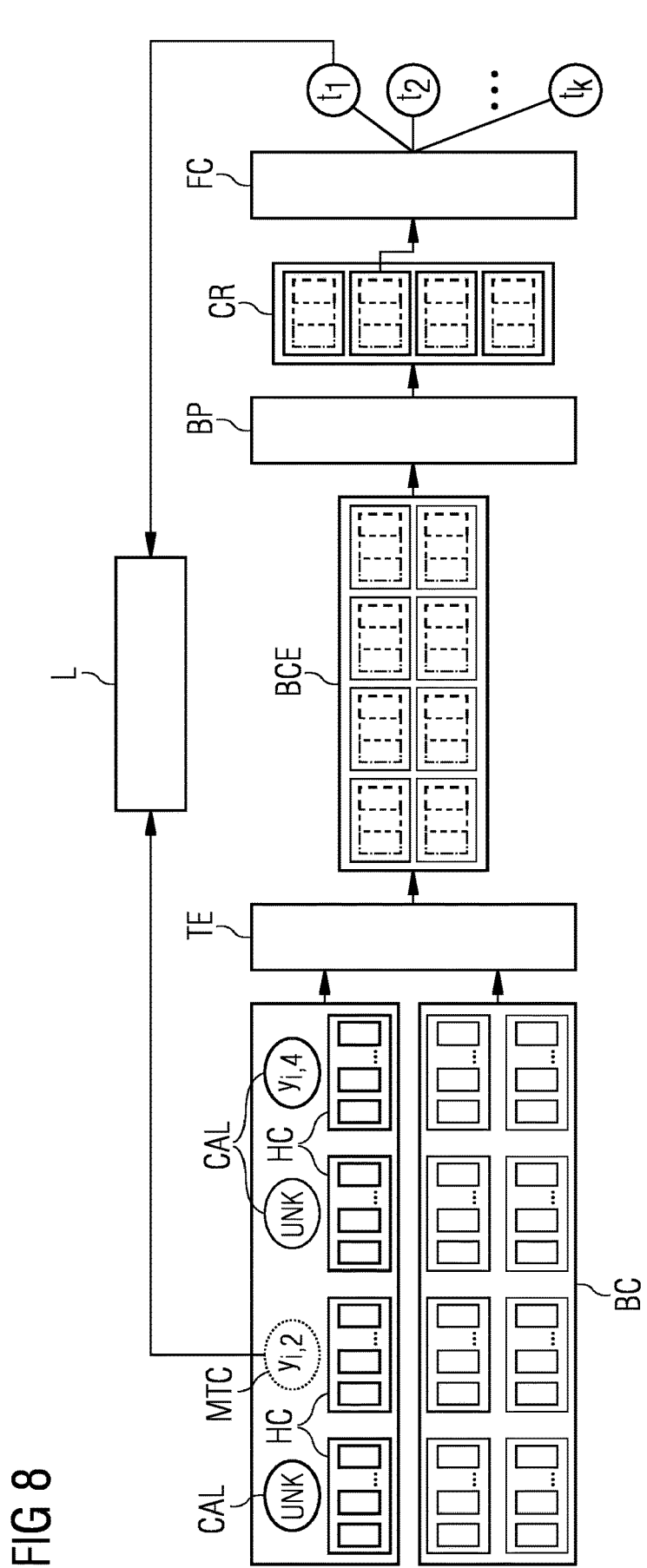
FIG. 8 shows a CTA training procedure that is masking true classes.

FIG. 8 shows a CTA training procedure that masks true classes. For the task of column type annotation, the training procedure is as follows:

For each table in the training data (i.e., it has at least one known column annotation represented by a column annotation label CAL) a randomly sampled mask is used to mask a subset or all of the known column annotations represented by the column annotation labels CAL. In FIG. 8, a masked true class MTC is masked among the column annotation labels CAL. A loss L is then calculated based on how well the masked column annotations can be reconstructed. During the CTA training procedure, parameters of the table encoder TE and a classifier (described below) are adjusted in order to minimize the loss L. The table-conditioned and label-conditioned machine learning model that is to be trained by the CTA training procedure is mainly formed by the table encoder TE and the classifier.

As shown in FIG. 8, a body pooling component BP pools over the body cell embeddings BCE and provides column representations CR. For example, the body pooling component BP averages the body cell embeddings BCE of each column in order to compute each column representation CR. As an alternative, the body pooling component BP can be implemented to perform attention-based pooling, for example. The column representations CR are fed into the classifier, for example a fully connected layer FC, that is used to produce the final confidence scores for each column annotation class $t_1, t_2, \ldots, t_k$ in T. In the example shown in FIG. 8, the confidence scores are computed for the second column with the masked true class MTC. The classifier can also be implemented as a multi-layer neural network if a single layer is not enough. For example, the classifier could be fed consecutively with each of the column representations CR, thereby producing the final confidence scores for all column annotation classes $t_1, t_2, \ldots, t_k$ in T for each column consecutively.

For a table with m known column annotations, there are $2^m-1$ different ways of masking/conditioning the predictions (minus one for the case where every column annotation is masked).

Note that the $4^{th}$ column annotation $y_{i,4}$ is provided as input and hence the prediction of the $y_{i,2}$ columns annotation is conditioned on it.

Uniform Slicing Sampling

Figure 9:
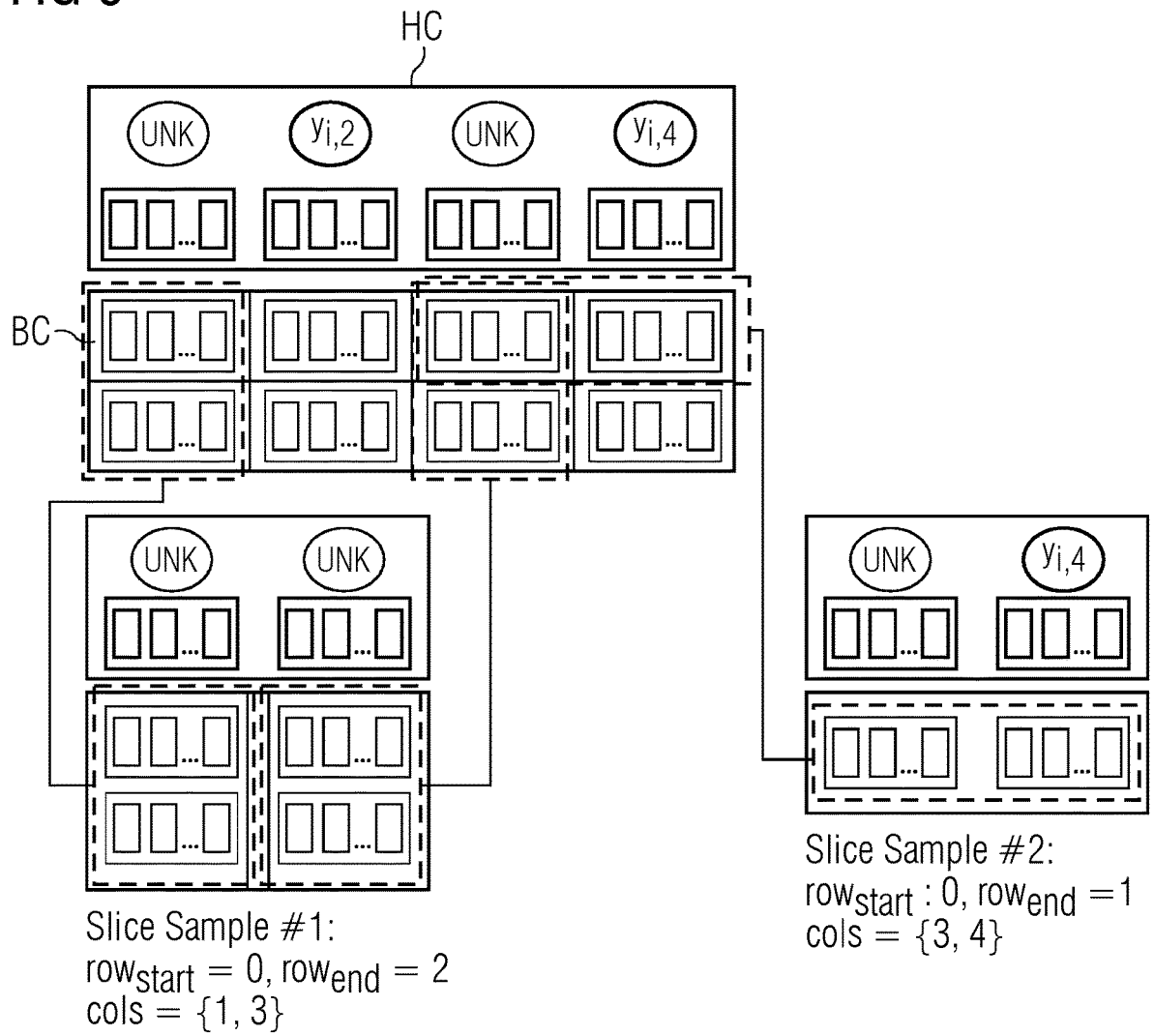
FIG. 9 shows uniform slicing sampling, wherein multiple sub-tables are generated from a single one.

FIG. 9 shows an example of uniform slicing sampling, wherein multiple sub-tables are generated from a single one. In the example shown in FIG. 9, two slices are sampled.

In addition to the previously mentioned masking, uniform slicing sampling can be applied as another data augmentation strategy to further avoid overfitting to very particular table contexts in the training data.

Instead of presenting the same table structures to the model during every training epoch the idea is to randomly slice the body cells BC into smaller sub-tables. One training epoch means one iteration over the training data, such that the machine learning model (which is mainly formed by the token encoder and the classifier) has seen every example once. The goal of the uniform slicing sampling is to make the examples differ from training epoch to training epoch.

In each training epoch for each table of size nxm a set of column indices is sampled cols~Multinomial(p,m) by drawing m samples with uniform probability p. Additionally, a starting row index $row_{start}$~U[0,n−1] and an end row index $row_{end}$~U[$row_{start}$,n] are sampled from their respective uniform distributions.

The body cells BC that are fed into the model are only the cells within the slice $\{cell_{ij} | row_{start} \leq i \leq row_{end}, j \in cols\}$.

Inference Settings

Figure 10:
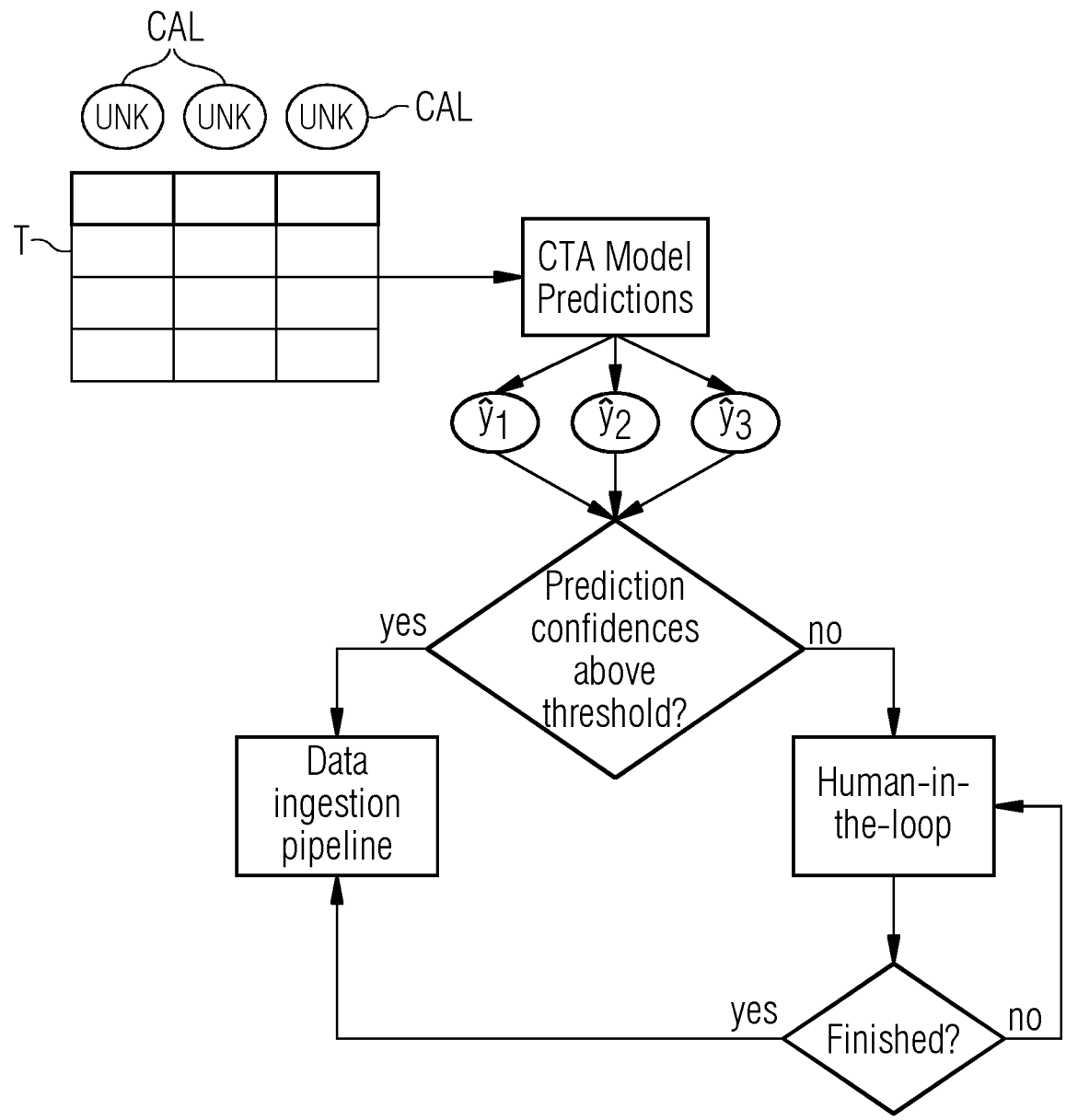
FIG. 10 shows decisions for closed-loop vs. human-in-the-loop inference.

FIG. 10 shows decisions for closed-loop vs. human-in-the-loop inference.

The embodiments can work in a completely automated closed-loop scenario as well as in a human-in-the-loop scenario. Depending on the confidence scores that are output by the classifier, the data in the table can be fed automatically into a data ingestion pipeline for downstream applications. If the confidence scores are too low, the system has to prompt a human domain expert for verification. This procedure is shown in FIG. 10.

Closed-Loop Inference

Tables are annotated with a trained CTA Model (the table-conditioned and label-conditioned machine learning model) according to one of the embodiments that have been described above. If the confidence scores that are output by the classifier are above a given threshold, the now annotated table can be fed automatically into further downstream data pipelines, e.g., data ingestion into a more structured database.

Human-In-the-Loop Inference

Figure 11:
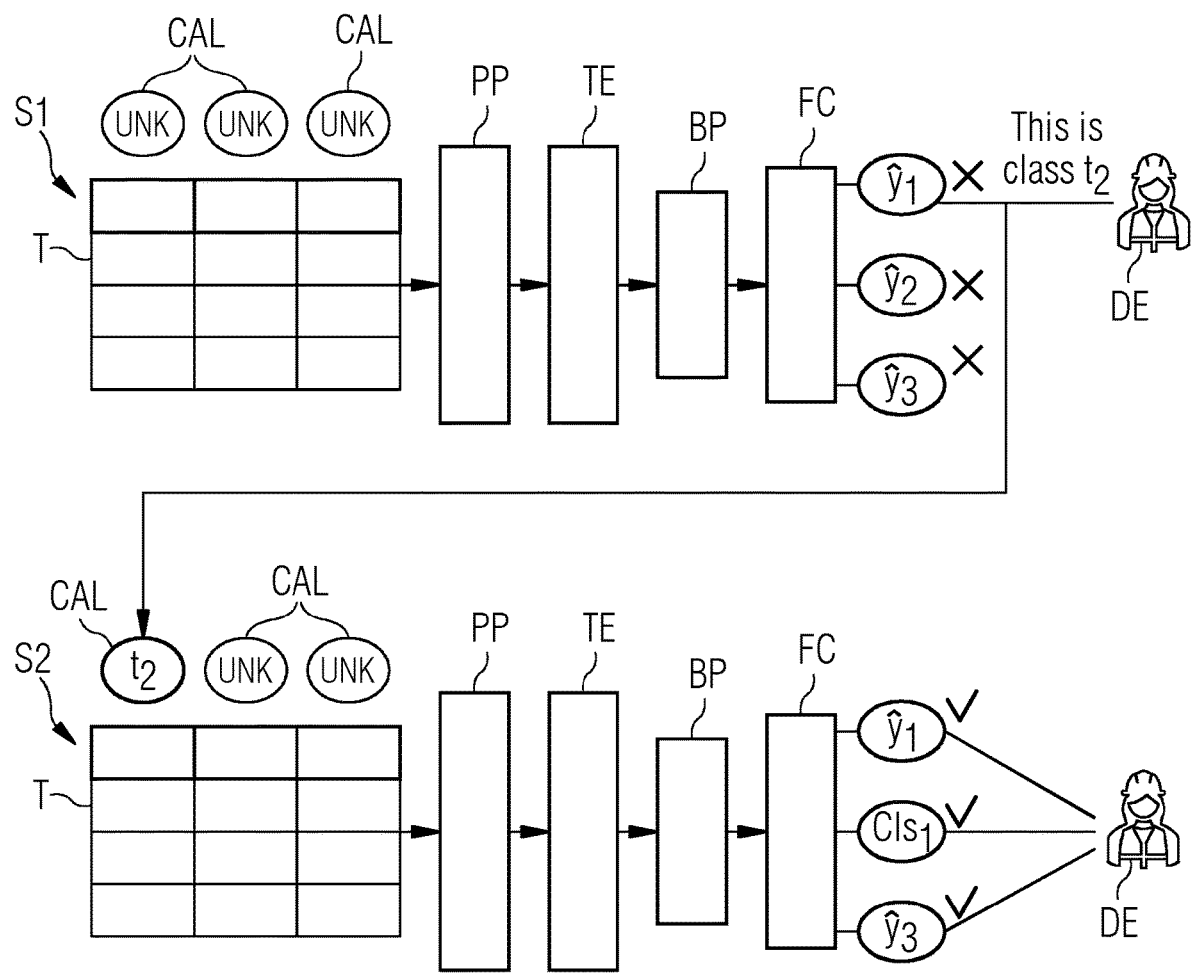
FIG. 11 shows interaction with a user, wherein as soon as feedback is given on one column, the predictions change conditioned on the feedback.

FIG. 11 shows an interaction with a domain expert DE. As soon as the domain expert DE gives feedback on one column at the end of a first step S1, by entering the correct column annotation class $t_2$ for the first column, the predictions change conditioned on this feedback of the domain expert DE in a second step S2.

The example user interaction in FIG. 11 shows that the domain expert DE providing a single column annotation in the first step S1 changes all the model's predictions in the second step S2. As a result, the domain expert DE just has to do a quick check in the second step S2. For tables with hundreds of columns, this could mean significant time savings.

The involvement of the domain expert DE in the loop is dependent on the certainty of the model for the assigned column annotation labels. In the case of more complex input data (for example tables with several columns containing only numerical data), help from the domain expert DE would be required. However, in the case of input tables with clean data and provided column annotation labels for some of the columns, the model could make predictions for the remaining columns with higher certainty. In that case, there would be no need for human expert involvement.

FIG. 12 shows a flowchart of a possible exemplary embodiment of a method for automated column type annotation.

In a transforming operation (OP1), a pre-processor transforms the table into a numerical tensor representation by outputting a sequence of cell tokens for each cell in the table.

In an encoding operation (OP2), a table encoder encodes the sequences of cell tokens and a column annotation label for each column into body cell embeddings, wherein at least one of the column annotation labels indicates a correct column annotation class for the respective column and at least one of the column annotation labels indicates that the column annotation class for the respective column is unknown.

In a processing operation (OP3), a body pooling component processes the body cell embeddings to provide column representations.

In a classifying operation (OP4), a classifier classifies the column representations in order to provide for each column, confidence scores for each column annotation class.

In a comparing operation (OP5), the highest confidence score for each column is compared with a threshold.

If the highest confidence score for each column is above the threshold, an annotating operation (OP8) annotates each column with the respective column annotation class.

If the highest confidence score for at least one of the columns is below the threshold, a user interface performs an outputting operation (OP6) that outputs for each column the column annotation class with the highest confidence score.

In a detecting operation (OP7), the user interface detects a user interaction providing a revised column annotation label for one of the columns that specifies a correct column annotation class.

The encoding operation (OP2), processing operation (OP3), classifying operation (OP4), and comparing operation (OP5) are then repeated based on the revised column annotation label.

For example, the method can be executed by one or more processors. Examples of processors include a microcontroller or a microprocessor, an Application Specific Integrated Circuit (ASIC), or a neuromorphic microchip, in particular a neuromorphic processor unit. The processor can be part of any kind of computer, including mobile computing devices such as tablet computers, smartphones or laptops, or part of a server in a control room or cloud.

The above-described method may be implemented via a computer program product including one or more computer-readable storage media having stored thereon instructions executable by one or more processors of a computing system. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing, and the like.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer implemented method for automated column type annotation, wherein the method maps each column contained in a table to a column annotation class of a set of column annotation classes, wherein each column contains a header cell and a set of body cells,
   comprising the following operations, wherein the operations are performed by components, and wherein the components are hardware components and/or software components executed by one or more processors:
   transforming, by a pre-processor, the table into a numerical tensor representation by outputting a sequence of cell tokens for each cell in the table,
   encoding, by a table encoder, the sequences of cell tokens and a column annotation label for each column into body cell embeddings, wherein at least one of the column annotation labels indicates a correct column annotation class for the respective column and at least one of the column annotation labels indicates that the column annotation class for the respective column is unknown,
   processing, by a body pooling component, the body cell embeddings to provide column representations,
   classifying, by a classifier, the column representations in order to provide for each column, confidence scores for each column annotation class,
   comparing the highest confidence score for each column with a threshold, and
   if the highest confidence score for each column is above the threshold, annotating each column with the respective column annotation class.

2. The method of claim 1, with the additional operation of automatically feeding data contained in the table as well as the column annotations into an automated data ingestion pipeline.

3. The method of claim 1, with the additional operations of
   if the highest confidence score for at least one of the columns is below the threshold,
      outputting, by a user interface, for each column the column annotation class with the highest confidence score,
      detecting, by the user interface, a user interaction providing a revised column annotation label for one of the columns that specifies a correct column annotation class, and repeating the operations of encoding, processing, classifying, and comparing based on the revised column annotation label.

4. The method according to claim 1, wherein the table encoder and the classifier form a table-conditioned and label-conditioned machine learning model, which is a parameterized function that corresponds to a probability of a column annotation class of a column and is conditioned on the table as well as all the column annotation labels.

5. The method according to claim 1, wherein the table encoder performs the operations of
encoding, by a cell token encoder, in particular a neural network, the sequences of cell tokens of the header cells and the body cells into latent header cell representations and latent body cell representations,
encoding, by a column label encoder, each column annotation label into a latent label representation,
processing, by a row transformer and a column transformer, the latent body cell representations,
transforming, by a header transformer, each latent header cell representation and the corresponding latent label representation into a header cell embedding, and
aggregating, by an aggregator, the output of the row transformer, the output of the column transformer, and the header cell embeddings into the body cell embeddings.

6. The method according to claim 1, wherein parameters of the table encoder and the classifier are initially trained with the following operations:
storing, in a database, a set of training tables and at least one column annotation label indicating a correct column annotation class for the respective column for each training table,
randomly sampling a mask for each training table, with the mask masking at least one of the column annotation labels for the respective training table,
computing, by the classifier, for the column with the masked column annotation label confidence scores for each column annotation class,
minimizing, during training, a loss between the correct column annotation class and the computed confidence scores.

7. The method according to claim 6,
wherein the set of training tables is at least in part generated using uniform slicing sampling, wherein multiple sub-tables are generated as training tables from a source table by randomly slicing body cells of the source table.

8. The method according to claim 6,
wherein before training, a self-supervised pre-training procedure is executed comprising the operations of
sampling body cell masks randomly, resulting in masked cells that are not visible to the table encoder, and
training a token decoder to reconstruct a content of each masked cell while simultaneously training the token encoder, wherein a loss between the original content of the masked cell and the reconstructed content of the masked cell is minimized.

9. The method according to claim 1,
wherein the classifier is a neural network, in particular a fully connected layer or a multi-layer neural network.

10. A system for automated column type annotation, mapping each column contained in a table to a column annotation class of a set of column annotation classes, wherein each column contains a header cell and a set of body cells, comprising the following components:
a pre-processor, configured for transforming the table into a numerical tensor representation by outputting a sequence of cell tokens for each cell in the table,
a table encoder, configured for encoding the sequences of cell tokens and a column annotation label for each column into body cell embeddings, wherein at least one of the column annotation labels indicates a correct column annotation class for the respective column and at least one of the column annotation labels indicates that the column annotation class for the respective column is unknown,
a body pooling component, configured for processing the body cell embeddings to provide column representations,
a classifier, configured for classifying the column representations in order to provide for each column, confidence scores for each column annotation class, and
at least one processor, configured for
comparing the highest confidence score for each column with a threshold, and if the highest confidence score for each column is above the threshold, annotating each column with the respective column annotation class.

11. A computer program product, comprising a computer readable hardware storage device having computer readable program code stored therein, said program code executable by a processor of a computer system to implement a method, with program instructions for carrying out the method according to claim 1.

12. A provisioning device for the computer program product according to claim 11, wherein the provisioning device stores and/or provides the computer program product.

* * * * *